(12) United States Patent
Porikli et al.

(10) Patent No.: US 8,358,823 B2
(45) Date of Patent: Jan. 22, 2013

(54) METHOD FOR TRACKING TUMORS IN BI-PLANE IMAGES

(75) Inventors: Fatih M. Porikli, Watertown, MA (US); Mohamed Hussein, Somerville, MA (US)

(73) Assignee: Mitsubishi Electric Research Laboratories, Inc., Cambridge, MA (US)

( * ) Notice: Subject to any disclaimer, the term of this patent is extended or adjusted under 35 U.S.C. 154(b) by 121 days.

(21) Appl. No.: 13/075,822

(22) Filed: Mar. 30, 2011

(65) Prior Publication Data

US 2012/0250933 A1 Oct. 4, 2012

(51) Int. Cl.
  *G06K 9/00* (2006.01)
(52) U.S. Cl. .......................... 382/128; 382/154; 382/173
(58) Field of Classification Search .................. 382/128, 382/154, 173
  See application file for complete search history.

(56) References Cited

U.S. PATENT DOCUMENTS

| | | | | |
|---|---|---|---|---|
| 6,047,080 A | * | 4/2000 | Chen et al. | 382/128 |
| 6,148,095 A | * | 11/2000 | Prause et al. | 382/131 |
| 6,273,366 B1 | * | 8/2001 | Sprenger et al. | 244/118.5 |
| 6,501,848 B1 | * | 12/2002 | Carroll et al. | 382/128 |
| 6,824,517 B2 | * | 11/2004 | Salgo et al. | 600/443 |
| 7,609,810 B2 | * | 10/2009 | Yi et al. | 378/65 |
| 7,689,261 B2 | * | 3/2010 | Mohr et al. | 600/407 |
| 8,160,677 B2 | * | 4/2012 | Gielen et al. | 600/427 |

* cited by examiner

*Primary Examiner* — Tom Y Lu
(74) *Attorney, Agent, or Firm* — Dirk Brinkman; Gene Vinokur

(57) ABSTRACT

A tumor is tracked in sequences of bi-plane images by generating a set of segmentation hypotheses using a 3D model of the tumor, a bi-plane geometry, and a previous location of the tumor as determined from the pairs of biplane images. Volume prior probabilities are constructed based on the set of hypotheses. Seed pixels are selected using the volume prior probabilities, and a bi-plane dual image graph is constructed using intensity gradients and the seed pixels to obtaining segmentation masks corresponding to tumor boundaries using the image intensities to determine a current location of the tumor.

19 Claims, 4 Drawing Sheets

100

METHOD FOR TRACKING TUMORS IN BI-PLANE IMAGES

FIELD OF THE INVENTION

This invention relates generally to tracking 3D objects, and more particularly to tracking a moving tumor in sequences of bi-plane images for the purpose of particle beam radiotherapy.

BACKGROUND OF THE INVENTION

Particle beam radiotherapy delivers charged particles to a tumor while minimizing damage to surrounding healthy tissue. An energy deposition profile of the particles has a Bragg peak. The peak occurs immediately before the particles come to rest. The profile can be controlled to deliver a maximum energy within a few millimeters of the range of the particles. Thus, the prescribed irradiation is focused on the tumor with little side scatter and broadening of the beam.

However, due to random and systemic motion, the tumor must be tracked continuously in real-time during treatment. Several modalities such as ultrasound, X-ray, and magnetic resonance imaging (MRI), are used to track internal structures of the body. Among these, the ultrasound imaging offers a noninvasive alternative to X-ray. Being cost and time efficient, a high-frequency ultrasound system with 3-D imaging capabilities also achieves better resolution, discrimination and detection of abdominal metastases at a minimum size, and compares favorably with that of X-ray imaging.

Ultrasound imaging depicts not only the center of the tumor but also the entire volume and boundary for a large variety of high contrast neoplasms. Ultrasound imaging is conventionally used for detection and staging of tumors For visible tumors, the tumor tracking can be performed by image segmentation, wherein each pixel is labeled either as foreground (tumor), or background (healthy tissue). This task fits naturally into level set and graph partitioning techniques. For image segmentation, the level set describes the evolution of a front over time, and more specifically for image segmentation, a boundary between two separate and closed regions.

By indirectly modeling the front as an embedding of a zero level set of an implicit time-dependent higher dimensional function, these challenges are addressed without the need to treat them as special cases. Then, the evolving front can be followed by tracking the zero level set of that implicit function, for example, starting with a closed curve and allowing the curve to move perpendicularly to itself from an initial speed, derived locally from an image. Typical techniques represent the evaluation of the curve by a discrete parameterization as a set of points whose locations are updated according to a given model.

Graph cut based segmentation techniques are efficient, accurate, and guarantee a global optimum for a wide family of energy functionals. In graph theory, a cut is a partition of the vertices (nodes) of a graph into two disjoint subsets. Given a set of foreground pixels and a set of background pixels, an image is represented by a graph, and a maximum a posteriori (MAP) estimate of a binary segmentation can be obtained by maximizing the flow through the graph. Evaluated for an object/background assignment, the graph edge energies are designed as a data dependent term. Each pixel is considered as a vertex in the graph.

The graph includes two additional vertices, a source and a sink, which represent the overall foreground and background, respectively. A data dependent term is realized by connecting each pixel in an image to both the object and background vertices with weighted edges. A minimum cut of the weighted graph represents the segmentation that best separates the foreground from the background. A cut is minimal if the sum of the weights along the cut is not larger than the sum of any other cut. Due to this property, graph cut methods tend to generate compact regions, even if the underlying appearance depicts elongated objects.

Shape prior information can be incorporated in the graph cut framework without compromising the global optimality of the process. The shape prior information can be encoded using a distance transform of the shape after the prior information and images are aligned at multiple scales and a pairwise cost term is appended with a shape match cost term for neighboring pixels. This cost term is submodular. Hence, the global optimal solution can still be obtained. However, the modified process has to be repeated for different scales to determine the best match, which is time consuming.

Other techniques incorporate shape prior information into unary terms. Kernel principal component analysis (PCA) can be used to train a generative model from training shapes. Graph cuts are performed iteratively starting with an initial contour. During each iteration, a pre-image is generated from the trained shape model, based on the segmentation from the previous iteration. The pre-image is used as a prior probability map, and a pixel-wise negative log-likelihood value is used to modify the terminal weights coded by the unary terms. An image normalization process is utilized to handle affine transformation of the shapes. By posing the multiphase level set segmentation in the graph cut framework, the method can segment disconnected regions.

One method is for tracking the left ventricle in 3D ultrasound images. However, that method is highly complex and relies on supervised learning on a training dataset, which may not be available in all cases.

Most graph cut methods are highly sensitive to the location and number of the source and sink pixels. A multi-label segmentation is posed as a random walk problem. An equivalent continuous Dirichlet process is reformulated on a graph using the combinatorial operators. Image segmentation is obtained by solving a sparse system of linear equations constrained on the given labels of a set of seed pixels (seeds). Color prior probability information, in the form of a Gaussian mixture obtained from training data, can be incorporated into the random walk segmentation process.

However, extending the above described methods to tracking tumor in a sequence of images is not straightforward and requires an elaborate or manual selection of the sink and source pixels in consecutive images.

SUMMARY OF THE INVENTION

To address the shortcomings of the above approaches, the embodiments of the invention formulates tumor tracking as a time-wise progressive 3D segmentation problem in an energy minimization framework where a 3D model of the tumor is imposed as prior information. The invention is based on a sequence of bi-plane images, instead of full 3D ultrasound or computer tomography (CT) images as in the prior art.

The embodiments of our invention provide a method for tracking a 3D tumor in sequences of bi-plane images using the 3D shape of the tumor as prior information. The bi-plane images are acquired by transducer arrays that are rotated with respect of each other to provide simultaneous views in two image planes.

The tumor boundary is segmented in each image using graph propagation. Segmentation seed pixels (seeds) are inferred by combined bi-plane dual image segmentation. Segmentation hypothesis are generated from the 3D shape and used to locate seed pixels in the images, and to filter an intensity-based foreground probability map.

A distance function is applied to the filtered foreground probability map to construct a Laplacian matrix for segmentation. Then, the resulting segmentation mask is matched to the shape prior information to locate the 3D tumor.

Our method use inference graphical models superimposed in the same graph. The volume of the tumor has a central role in the inference process. Along with the 3D location of the tumor, the volume is used in inferring the boundary segmentation in the two views. Along with the estimated boundary segmentations, the volume is used in inferring the new 3D location.

For inferring the 3D location, we use particle filtering, where each particle is a possible new location for the tumor. From the volume, each particle is mapped to the segmentation masks associated with the volume. By matching these segmentation hypothesis with the resulting segmentation (using the overlap ratio), a matching score is determined. We finally use the particle that provides the optimal matching segmentation hypothesis using maximum a posteriori (MAP) estimation, i.e., the one where the matching score is less than a predetermined threshold.

Given the current location of the tumor, which is the initial location in the first frame of an image sequence, a set of segmentation hypotheses for the new frame is generated. Using these hypotheses, a prior probability is constructed. From this prior probability, segmentation seeds for the new frame are marked. Intensity distributions for foreground and background are learned using the selected seeds, which lead to a data-driven prior probability for the segmentation. A single joint graph is constructed that combines graphs for two frames for each plane. Graph-based segmentation is performed on the joint graph to obtain initial segmentation results in two frames. The initial segmentation outcome is refined by replacing the initial segmentation results with the best fitting segmentation hypotheses.

DETAILED DESCRIPTION OF THE PREFERRED EMBODIMENT

Figure 1:
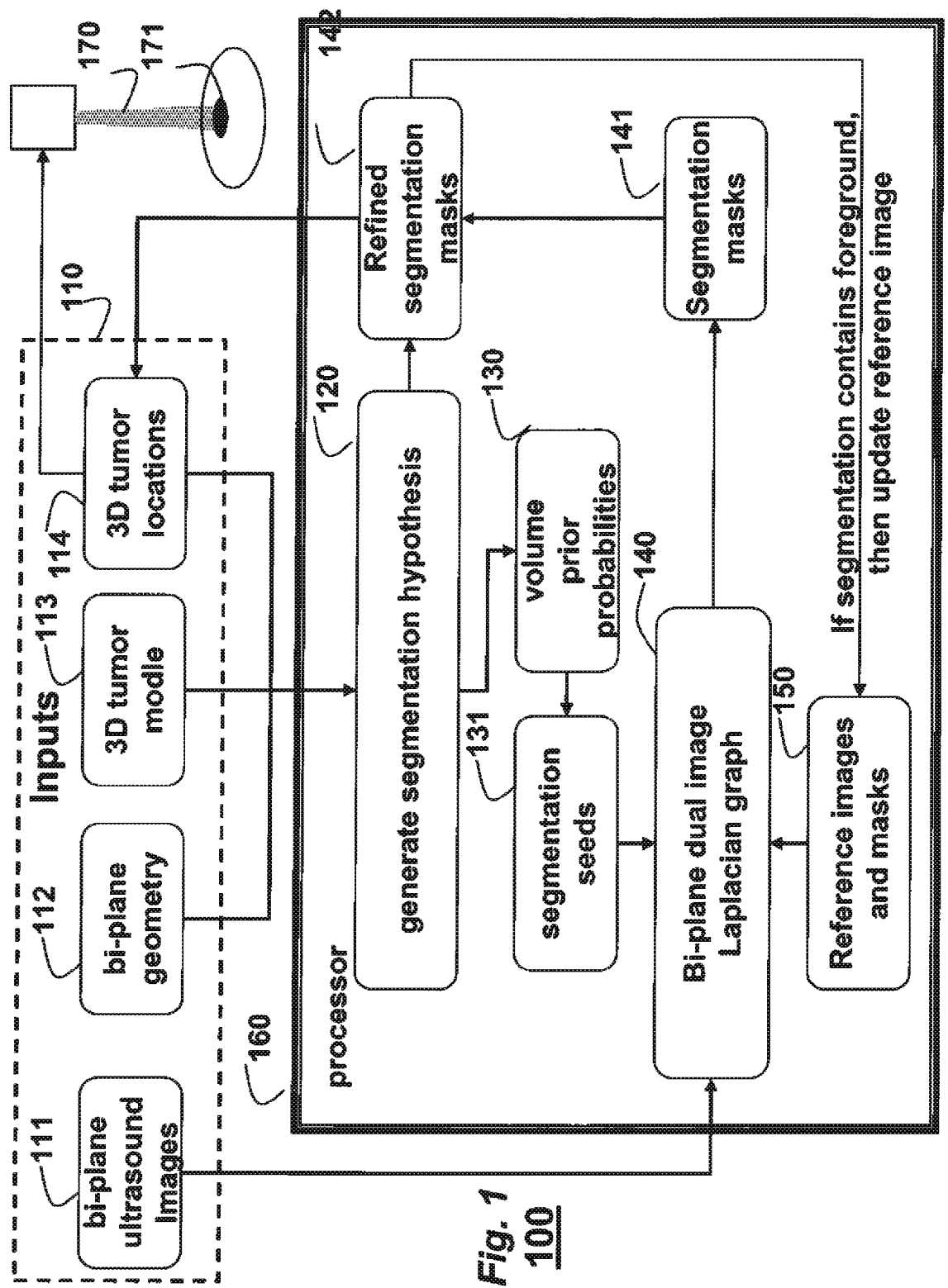
FIG. 1 is a flow diagram of a method for tracking a 3D tumor in sequences of bi-plane images using the 3D shape of the tumor as prior information according to embodiments of the invention.

FIG. 1 shows a method 100 for tracking a 3D tumor in sequences of bi-plane images using a 3D model of the shape of the tumor as prior information according to embodiments of our invention.

Inputs 110 to the method include two sequences of pairs of bi-plane images 111, a bi-plane geometry 112, a 3D model 113 of the tumor, and an initial 3D tumor location 114. The initial location can be estimated or approximate. Iterations of the method update the location 114 as the tumor is tracked. In one embodiment, the bi-plane images are acquired by two ultrasound transducer arrays that are rotated with respect of each other to provide simultaneous views in two image planes. Hence, at each time instant, there is a pair of two images. It is understood that the invention can also be worked with other imaging modalities.

For each pair of current image in the sequence 111, a set of hypotheses are generated 120 using the 3D tumor model 113 given the bi-plane geometry 112, and the location 114 of the tumor in the previous image. Using the hypotheses, volume prior probabilities 130 are constructed. Segmentation seed pixels (seeds) 131, if any exists, in the current image are selected after bi-plane segmentation of the previous image imposing the volume prior probabilities to refine the seed locations.

Intensity distributions for the foreground and background assignments are determined using the selected seeds, and intensity prior information is obtained from the distributions. Using multiple images of two image sequences, a bi-pane dual image 3D graph is constructed 140 using the intensity gradients. A Laplacian matrix is constructed by a distance function on the probability map and incorporating the intensity prior information.

Corresponding tumor boundaries (segmentation masks) 141 are obtained in each image using graph propagation. The segmentation masks can then be refined 142 using the set of hypotheses 120 to obtain the current 3D location 114 of the tumor.

Then, the current location of the tumor can be used to ensure that the particle beam 170 is directed at the tumor 171 during radiotherapy.

Reference images and masks 150 are maintained and updated if the segmentation contains foreground pixels.

The steps of the above described method can be performed in a processor 160 connected to memory and input/output interfaces as known in the art.

Graph Propagation

Given each input image 111, the objective is to partition the image into K segments by assigning a label l∈1, ..., K to each pixel in the image. Let the input image I be represented as a graph G=(V, E, w), where V={$v_i$|i=1, ..., N} is a set of vertices corresponding to the N pixels in the image, E={$e_{ij}$=($v_i$, $v_j$)|i,j=1, ..., N} is a set of edges in the graph corresponding to groups of neighboring pixels, and w is a weighting function for the graph edges that measures an affinity between the two vertices of each edge.

In this graph, the edges encode the neighborhood structure and the edge weights indicate a similarity between the pixels corresponding to the vertices at each end of the edge. For intensity images, e.g., X-ray and ultrasound images, a weighting function w($e_{ij}$) for an edge between vertices i and j can be formulated as $$w(e_{ij}) = \exp(\alpha(F(\alpha_i) - F(v_j))^2) \tag{1}$$

where α is a constant, $v_i$ and $v_j$ are vertices, and F is intensity map of the input image.

A graph propagation framework determines a discrete labeling function r that minimizes a combinatoric Dirichlet integral. To have a better intuition about how the process works, we start from the continuous Dirichlet problem. The continuous Dirichlet integral of the function r over a region Ω defined as $$D[r] = \frac{1}{2} \int_\Omega |\nabla r|^2 d\Omega \tag{2}$$

The integral measures a smoothness of the function r over the region Ω. The integral is always non-negative and has a minimum value of zero when r is constant. Determining the function that minimizes the Dirichlet integral becomes more interesting if the value of the function is known at some points. The known values of the function are called the boundary conditions. The problem of determining the minimizing function given the boundary conditions is called the boundary Dirichlet problem. In the discrete domain, the combinatoric Dirichlet integral becomes $$D[r] = \frac{1}{2} r^T L r \qquad (3)$$

where T is the transpose operator, L is the N×N combinatoric Laplacian matrix of the graph $$L_{ij} = \begin{cases} d_i & \text{if } i = j, \\ -w_{ij} & \text{if } v_i \text{ and } v_j \text{ are adjacent nodes,} \\ 0 & \text{otherwise,} \end{cases} \qquad (4)$$

where $$d_i = \sum_{j, e_{ij} \in E} w_{ij} \_ d_i = \sum_{j, e_{ij} \in E} w_{ij} \qquad (5)$$

Hence, the discrete function r that minimizes the Dirichlet integral equation is $$Lr = 0 \qquad (6)$$

The rank of the Laplacian matrix L is at most N−1, i.e., L is singular. As a result, with no more knowledge about the function r, there are infinite solutions, i.e., any constant function is a solution. The more interesting case is when we know the value of r for some of the seed pixels. The function r is partitioned as $r_M$ for labeled (marked) pixels, and $r_U$ for unlabeled pixels. After reordering the entries in the matrix L, accordingly, the Dirihlet integral equation can be rewritten as $$D(r_U) = \frac{1}{2} [r_M^T \ r_U^T] \begin{bmatrix} L_M & B \\ B^T & L_U \end{bmatrix} \begin{bmatrix} r_M \\ r_U \end{bmatrix} \qquad (7)$$

where B is a submatrix formed after the rearrangement of the coefficients of the L matrix corresponding to the known labels on the upper left ($L_M$) and unknown labels on the lower right ($L_U$), and T indicates matrix transpose.

By taking derivatives of $D(r_U)$ with respect to $r_U$, and then setting the derivatives to zero, we obtain the following system of linear equations $$L_U r_U = -B^T r_M \qquad (8)$$

in which $L_U$ is positive-definite as long as the graph is connected, or every connected component has an associated seed pixel.

As we described above, the Dirichlet integral measures the smoothness of the label assignment. In fact, the solution to the Dirichlet problem assigns each pixel a weighted average of labels of neighboring pixels according to the mean value theorem.

For our segmentation problem, the numeric values of the labels are meaningless. Hence, the weighted average of a number of label values is not useful. Therefore, instead of solving the Dirichlet boundary problem for a labeling function, we solve the problem for a probability function for each label separately. Let $r^s$ be the function that assigns the probability $r^s_i$ to a vertex $v_i$ for taking the label s. The labeled parts of $r^s$, $r^s_M$, take the value 1 for seed vertices having the label s and the value 0 for all other seed vertices.

Therefore, the solution for label s can be obtained by solving $$L_U r_U^s = -B^T r_M^s. \qquad (9)$$

We define a $N_M \times K$ matrix $r_M$, where $N_M$ is the number of seed vertices, such that the 1's column of $r_M$ is $r^I_M$. In other words, each row of $r_M$ is a length K indicator vector of the form $$r^s_j = \begin{cases} 1 & \text{if the seed } v_j \text{ is labeled as } s, \\ 0 & \text{if the seed } v_j \text{ take another label.} \end{cases} \qquad (10)$$

Similarly, we define a $N_U \times K$ matrix $r_U$, where $N_U$ is the number of unlabeled vertices. The solutions for all labels can be obtained by solving $$L_U r_U = -B^T r_M. \qquad (11)$$

Because $r^s_i$ is the probability of vertex $v_i$ taking on label s, $r_i$ satisfies the following condition $$\sum_s r_i^s = 1, \forall v_i \in V. \qquad (12)$$

Therefore, only K−1 linear systems need to be solved. Each of these linear systems is sparse because the matrix L is sparse. The name graph propagation comes from the fact that for each pixel v and label s, the solution to Eqn. (11), is the probability that a hypothetical particle propagating through the graph starting from v, and moving in a Brownian motion with transition probabilities proportional to edge weights, first reaches a seed pixel with label s.

Graph Construction

Our graph combines new current frames and previous reference frames, and also combines multiple views. Segmentation on a single unified graph has benefits beyond maintaining segmentation consistency. The segmentation enables us to correctly label pixels when the tumor disappears from one or more views, see FIG. 2 described in detail below.

Temporal Consistency

Given, the model of the 3D tumor and the initial location, the segmentation of the first frame can be directly inferred. To assign seeds in frames after the first frame, it is not accurate to use the segmentation results of one frame as seeds for the next frame since frames may drastically differ. The new frame may not even have a foreground region if the tumor disappears.

In order to ensure the availability of the seeds, without enforcing erroneous label assignments, we jointly segment two frames. One frame is the current new frame, and the other is the reference frame. Instead of constructing a single grid graph for the new frame only, we construct a graph that has two parallel grids, one for each frame. Each pixel in one grid is connected to the corresponding one in the other grid. We consider the reference frame to be the preceding frame and we assume this frame has both foreground and background labels in its segmentation.

These labeled pixels of the reference frame serve as seed nodes in the combined graph. Other seed nodes can be added. In this way, we are always guaranteed to have seeds without forcing the seeds to be in the new frame.

Multi-View Consistency

We use the fact that the two imaging sequences in our setup correspond to two intersecting planes. The images corresponding to the two planes should have similar intensity values along the lines of intersection and, should be segmented consistently along these lines.

We use a bi-plane graph construction. In this construction, each plane is represented as a grid graph, and the two grids are connected along the intersection lines. The connection between the two grids is done such that each node in one grid along the line of intersection is connected to all the neighbors of its corresponding node in the other grid. We avoid directly connecting the two corresponding nodes since the 3D point locations of each two corresponding nodes are the same, which will make this connection dominate all others.

In addition to maintaining segmentation consistency between the two planes, such plane construction is useful in some tumor motion scenarios. When the intersection line of the two planes passes through the tumor, the foreground regions in the two planes constitute one connected component in the bi-plane graph. Hence, if seeds are available in only one plane, e.g., when tumor is starting to appear in one plane after disappearing from it for some time, the method uses the seeds in the other plane and produce better segmentation. The dual-frame construction is used with the bi-plane construction described here. However, the bi-plane connections are made only between the grids corresponding to the new frames since the reference frames may correspond to different time instances.

Handling Disappearing Tumors

Occlusion handling is a main component in any tracking process in the visible domain.

The tracked object may become briefly invisible due to an occluding object in the scene. The tracking process has to detect such an event, and resume tracking when the occluding event is over. For example, in ultrasound imaging, an equivalent phenomenon can happen when the tracked organ falls into the shadow caused by a highly reflective tissue interface.

Another motion scenario is when the tracked organ moves so that the organ no longer intersects the imaging plane (for ultrasound). This case needs a special handling since the foreground region will be lost completely for a period of time.

The most important cause of organ motion is the breathing motion. Fortunately, breathing motion is highly predictable due to its periodicity. Respiratory-induced motion is expected to cause an organ to approximately move along a closed trajectory. We consider the organ to be approximately moving back and forth along a similar path. Therefore, when a tracked organ moves off the imaging plane, the organ is expected to reappear and intersect the plane at a location that is close to when the organ was last detected.

We use the reference frame, and perform dual-frame segmentation. The reference frame has to be as close as possible to the current frame to be useful. Therefore, for an invisible tumor, given the motion pattern explained here, the best reference frame is the last frame in which the tumor was visible.

To detect whether the tumor is visible or not, we analyze the previous segmentation results. When the tumor becomes invisible, there will not be any pixels that are segmented as foreground. From the observations above, invisibility of tumors due to breathing motion can be effectively handled using the following update rule for the reference frame: If the segmentation result for the current frame has a nonempty foreground region, we update the reference frame to be the current frame. Otherwise, we keep the reference frame as is.

In one embodiment, we stop updating the reference frame when the foreground region is smaller than a specific threshold.

Prior Information in Graph Propagation

The graph propagation process described above uses only the labels of the seed pixels as prior information. In some cases, prior probability maps for each or some of the labels can be estimated. Incorporation of such probability maps in the segmentation framework can reduce the sensitivity of the solution to seed locations and image noise.

We now describe how prior information is incorporated in the graph propagation framework, and how we use the prior information in the visible tumor tracking problem.

Weight Computation Using Prior Information

As the graph propagation process solves an energy minimization problem, where the energy function is the Dirichlet integral, it is natural to incorporate prior probability maps as a regularization term in the energy function.

We denote the original energy in the Dirichlet integral equation as $\epsilon_{data}$. Thus, the general regularization framework for incorporating prior information can be formulated as $$\epsilon = \epsilon_{data} + \nu \epsilon_{prior}, \quad (13)$$

where $\nu$ controls the importance of the prior energy term compared to the data energy term. The minimizer for this extended energy functional can still be obtained by solving a sparse system of linear equations. Let $p^s$ be the prior probability map for label s. The extended system of linear equations for label s is $$(L_U + \nu I) r_U^s = \nu p^s - B^T r_M^s, \quad (14)$$

wherein $L_u$ is matrix corresponding to the unknown labels, $\nu$ is a blending parameter that controls the importance of the prior term, $r_U^s$ is the function that assigns the probabilities to unlabeled vertices for taking the label s, $p^s$ is the prior probability map for label s, $B^T$ is the transpose of a submatrix formed after the rearrangement of the coefficients of the L matrix, $r_M^s$ is the function that assigns the probabilities to labeled vertices for taking the label s, and I is an identity matrix with the same dimensions as $L_U$.

The extended formulation above is advantageous because the formulation allows our method to work in the absence of seed vertices, because the matrix $L+\nu I$ is always non-singular. However, it is hard to set the value for the parameter $\nu$ to obtain the desired behavior. A high $\nu$ value makes the solution highly influenced by the prior information, and a low value makes the prior information not effective.

As a problem, the above formulation sets a uniform weight for the prior information for all pixels, while we may want to change the influence of the prior information from one location to the other in the image.

To alleviate these problems, we introduce a novel way of incorporating the prior information in the segmentation by modifying the edge weighting function of Eqn. (1). The idea is that two pixels are more likely to have the same label if their prior probability profiles are substantially the same.

Therefore, we can incorporate the difference of prior probability values in the weighting function. In our foreground and background segmentation problem, if the prior foreground probability map is p, we use the weighting function $$w(e_{ij}) = \exp(\alpha_I (F(v_i) - F(v_j))^2 + \alpha_P |p(v_i) - p(v_j)|), \quad (15)$$

where $\alpha_I$ and $\alpha_p$ are the weights of the intensity-based distance and the prior-based distance, $v_i$ and $v_j$ are vertices, and F is intensity map of the input image. For a general K label segmentation, the absolute value difference in Eqn. (14) can be replaced by another distance measure, such as $\chi^2$ statistic.

The weighting function formulation in Eqn. (15) has a number advantages.

First, incorporating the prior information with the intensity difference in a single formula makes it much easier to adjust the relative weights to get the desired segmentation.

Second, when the noise in the intensity image and the noise in the prior probability map are uncorrelated, the new weighting function becomes more resistant to the noise because errors in the intensity, for example, may be eliminated by the prior information, and vice versa.

Third, using the prior information in pairwise interactions, instead of singleton potentials, makes the solution smoother.

Fourth, the sensitivity of the solution to the weight given to the prior information is reduced because the same prior information value for a pixel is used multiple times, e.g., twice the number of neighbors, and is given a different influence in each time.

3D Volume Prior Information

In our method, we use the 3D tumor model 113 to obtain probabilistic prior information for foreground segmentation. Knowing the current 3D tumor location, we generate 120 the hypotheses for the segmentation mask corresponding to hypotheses of a next 3D tumor location. Each segmentation hypothesis is a binary mask with value 1 assigned to foreground pixels and a value 0 assigned to background pixels. Then, we determine the average of these masks to obtain probabilistic prior information based on the 3D tumor model. We call this prior information the volume prior information, which is denoted it as $$p_V(v) = \sum_i h_i(v), \quad (16)$$

where $h_i$ is the i's segmentation hypothesis and v is a vertex.

Due to the uncertainty about the location of the tumor, and the possible significant deformation in the 3D shape of the tumor, which makes segmentation hypotheses significantly different from one another, the support area of the volume prior information may significantly overfit the target foreground region to be segmented. This can reduce the segmentation accuracy if the volume prior information is used.

However, the volume prior information contains information that can be used to enhance the accuracy of the segmentation. Some pixels have saturated probability values (either 0 or 1) in the volume prior information. These are the pixels that have the same label in all the generated segmentation hypotheses. Such pixels are used as seeds in segmenting the next image. We also describe another use for the volume prior information.

Appearance Prior Information

Using the seed pixels obtained from the volume prior information, we generate other probabilistic prior information based on the foreground and background appearances. We use the intensity values at the foreground and background seeds to determine two probability distributions for the foreground and background intensity values. We denote these distributions as $f_{fg}$ and $f_{bg}$. We call the new prior information the appearance prior information, denote as $$p_A(v) = \frac{f_{fg}(v)}{f_{fg}(v) + f_{bg}(v)} \quad (17)$$

where v is a vertex. The appearance prior information can assign high foreground probabilities to pixels belonging to the background because of their similarities to the foreground distribution. However, based on the information in the volume prior information, most of such pixels cannot be foreground. Therefore, we these pixels are filtered out. The final probabilistic prior we use is $$p_{fg}(v) = \phi(p_V(v)) p_A(v), \quad (18)$$

where $\phi(x)$ is a step function that takes the value 1 if x>0, and 0 otherwise.

Joint Bi-Plane Temporal Segmentation

The graph propagation process cannot work without labeling each seed pixel. However, the way we determine seeds from the volume prior information $p_V$ does not guarantee that we always have seeds. There is no guarantee that pixels with saturated $p_V$ probability values always exist. For example, when the tumor moves so much that one of the planes crosses very close the boundary of the tumor, some segmentation hypothesis may not contain any foreground pixels, which means that no pixels have a probability 1 of being foreground pixels.

On the other hand, we need to handle the case when the tumor becomes invisible. Foreground seeds are always inserted in foreground segment even if the tumor moves completely off one of the planes, and no foreground exits.

Temporal Segmentation

To ensure we always have seed pixels, without enforcing having foreground pixels, we jointly segment two images. One image is the current image, and the other is a reference image. Instead of constructing a grid graph only for the current only, we construct a graph that has two parallel grids, one for the reference image, and one for the current image. Each pixel in one grid is connected to the corresponding pixel in the other grid, see FIG. 2.

Because we cannot guarantee the existence of seed pixels in the current image, the reference image must contain pixels with both foreground and background labels after segmentation. The labeled pixels of the reference image serve as seed vertices in the combined graph. This is in addition to seed vertices in the current image, which are obtained using the volume prior information, if any exists. In this way, we are always guaranteed to have seed vertices in the graph without forcing the seed pixels to be in the current image.

Figure 2:
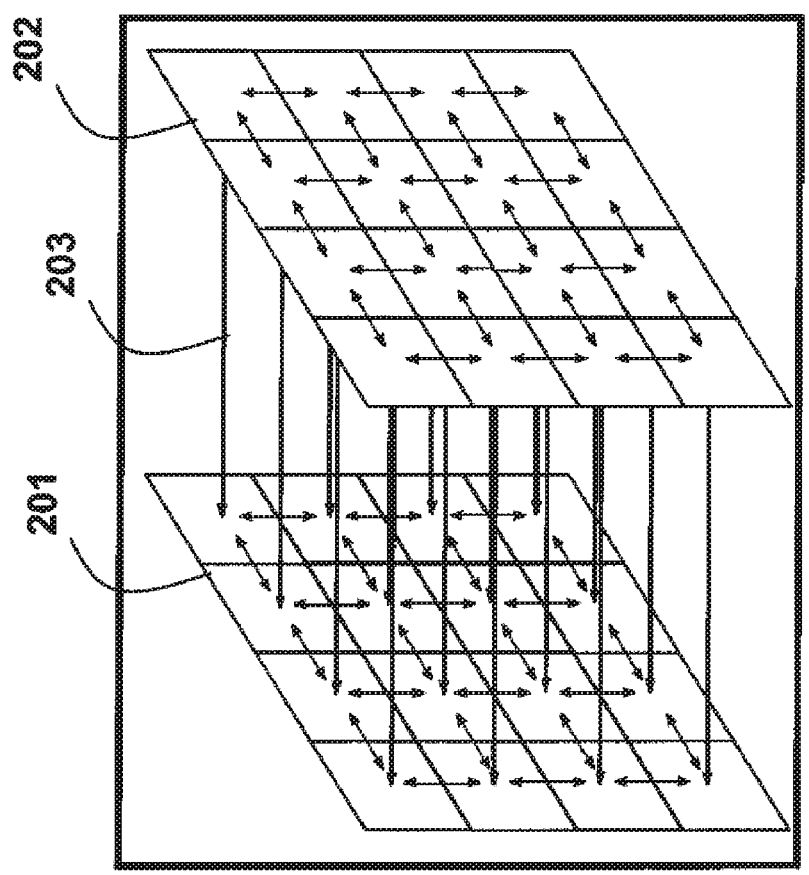
FIG. 2 is a schematic of a dual-image graph according to embodiments of the invention.

FIG. 2 shows the dual-image graph. For the process to work, each connected component of a particular label has to contain a seed vertex from that label. Therefore, for the dual-image construction to be useful, any connected component of a particular label in the current image 201 has at least one connection 203 to a seed vertex of that label in the reference image 202. For this to happen, we need the segmentation of the reference image segmentation has to be as close as possible to the desired segmentation of the current image.

If the shape of the tumor is connected and smooth, then the reference image is selected to be as close as possible in time to the current image. Because of this temporal relationship, we refer to this extension to the graph propagation process as temporal graph propagation. Assuming the tumor is always visible, the previous image is the best candidate to serve as the reference image. The case of invisible tumor is described below.

The dual-image graph construction solves the problem when no seeds in the current image can be identified from the volume prior information. However, if there are seeds in the current image, priority should be given to these seeds because there is no guarantee that the reference image is temporally near the current image.

To address this problem, we update the weighting function in Eqn. (14) to include the Euclidean distance between the two points, as $$w(e_{ij}) = \exp(\alpha_I (F(v_i) - F(v_j))^2 + \alpha_P |p(v_i)| + \alpha_D \|v_i - v_j\|). \quad (19)$$

where $\alpha_I$ and $\alpha_p$ are the weights of the intensity-based distance and the prior-based distance, $\alpha_D$ are the weights of the Euclidean distance, $v_i$ and $v_j$ are vertices, and F is intensity map of the input image.

In one embodiment, while constructing the graph, we assign point coordinates such that the distance between consecutive rows and columns of the same grid is 1 unit, and distance between two parallel grids is 5 units. In this way, similarities to pixels in the same grid are favored over similarities to pixels in a different grid.

Bi-Plane Segmentation

The images corresponding to the two planes have similar intensity values along the lines of intersection and are segmented consistently along these lines. To make use of this fact, we use the bi-plane graph construction 140.

In this construction, each plane is represented as a grid graph. The two grids 201-203 are connected along intersection lines 203. The connection between the two grids is done such that each vertex in one grid along the line of intersection is connected to all the neighbors of the corresponding vertex in the other grid. We avoid directly connecting the two corresponding vertices because the 3D locations of each two corresponding vertices are the same, which makes this connection dominate all others.

Figure 3:
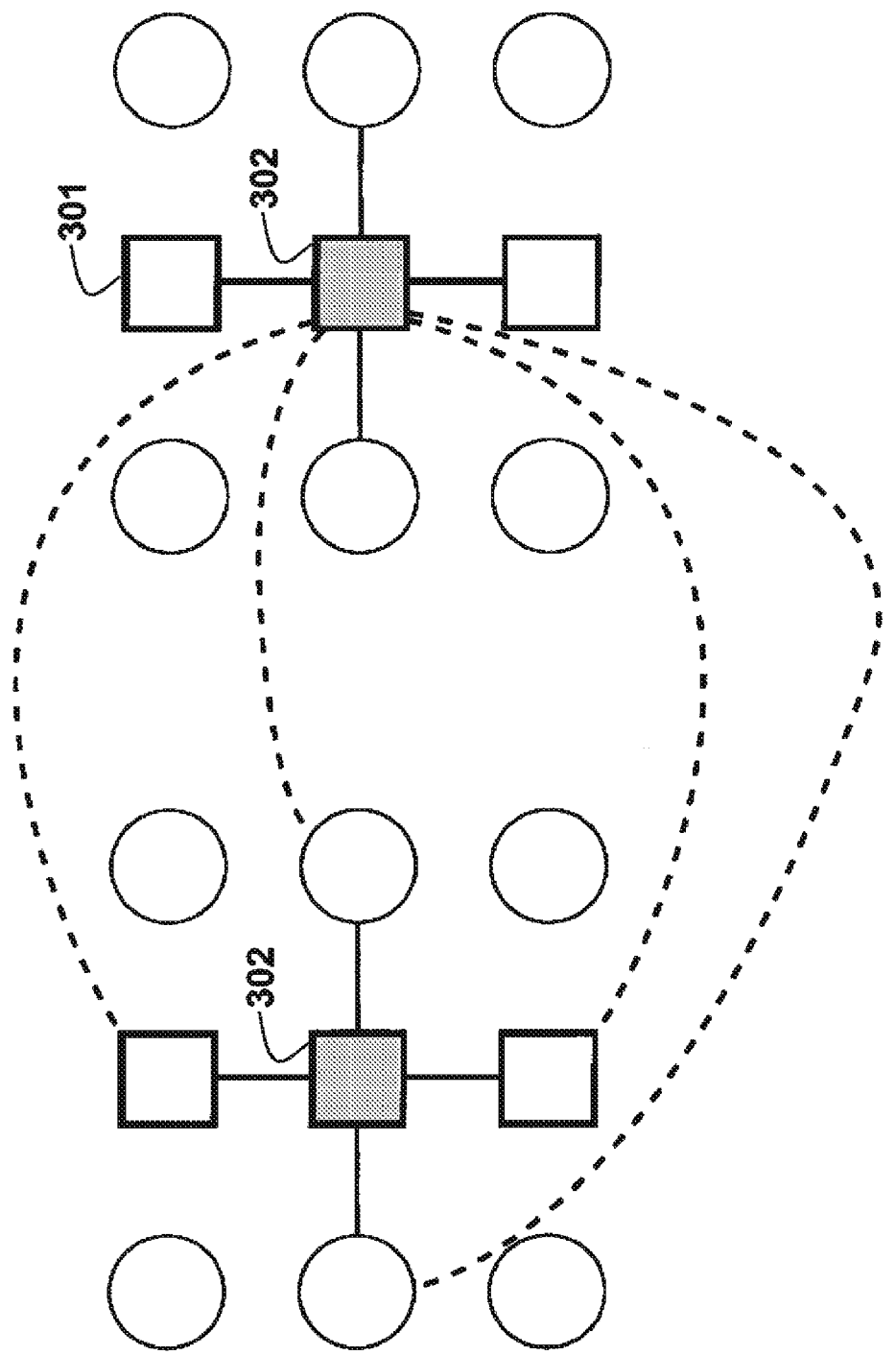
FIG. 3 is a schematic of a grid graph according to embodiments of the invention.

As shown in FIG. 3, square nodes designate the intersection line of the two grids, and corresponding vertices are corresponding. Each vertex 301 is connected to all neighboring vertices in the other grid. Only one is shown for clarity. The circles 300 indicate grid locations.

The bi-plane construction is very useful in some situations. Note that when the intersection line of the two planes passes through the tumor, the foreground regions in the two planes constitute one connected component in the bi-plane graph. Hence, if seeds are available in only one plane, then the process still works. Note also that the dual-image construction is used with the bi-plane construction described herein. However, the bi-plane connections are made only between the grids corresponding to the current images because the reference images can correspond to different time instances.

In an alternative embodiment, the segmentation can be obtained by region growing on the bi-plane graph. In the region growing, two active boundaries are propagated from the labeled foreground and background seed vertices at the same time. Then, at each iteration of region growing, the speed of the active boundary is determined by the weights of the vertices that constitute the boundary. The direction of the propagation is determined by the shape of the boundary. Finally, a vertex is assigned as a foreground (or background) if the active boundary from the foreground (or background) seeds arrives to that vertex first.

3D Tracking and Segmentation Refinement

Figure 4:
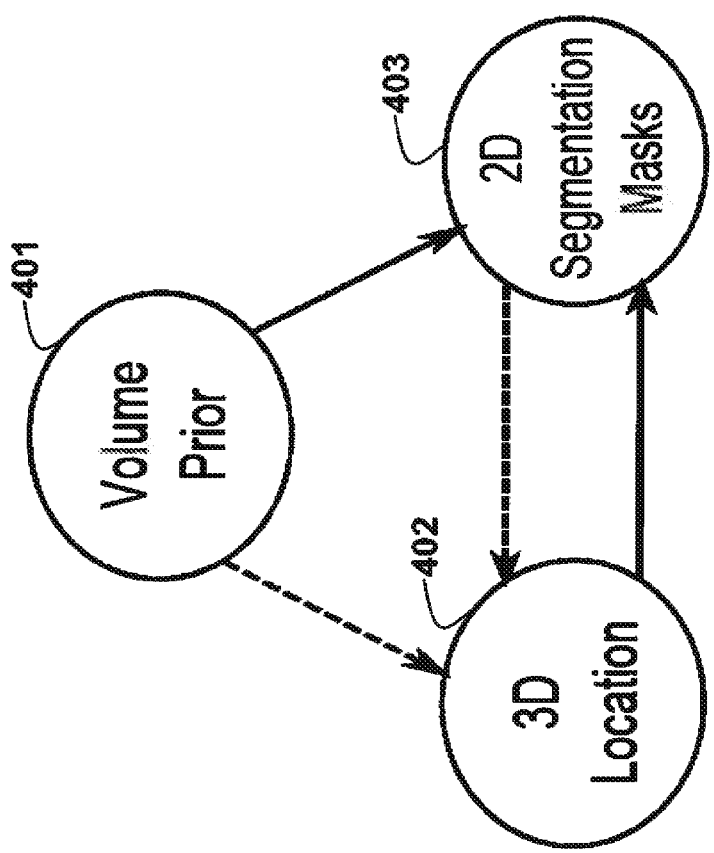
FIG. 4 is a schematic of a relationship between the volume prior, the 3D location, and the 2D segmentation masks.

After segmentation is performed, the 3D location of the tumor 114 is determined by matching the segmentation boundary in the two image planes to segmentation hypothesis obtained by slicing the tumor's 3D volume. The 3D location corresponding to the best matching segmentation masks are used as the new 3D location of the tumor. If the tumor becomes invisible in the two planes, then we declare the tumor as invisible and do not report the location because we do not have enough information about the location. The matching score used is the overlap ratio between the two masks. FIG. 4 shows the relationship between the volume prior 401, the 3D location 420, and the 2D segmentation masks 403.

Although the invention has been described by way of examples of preferred embodiments, it is to be understood that various other adaptations and modifications may be made within the spirit and scope of the invention. Therefore, it is the object of the appended claims to cover all such variations and modifications as come within the true spirit and scope of the invention.

We claim:

1. A method for tracking a tumor, comprising for each pair of current images in sequences of bi-plane images:
    generating a set of segmentation hypotheses using a 3D model of the tumor, a bi-plane geometry, and a previous location of the tumor as determined from each pairs of biplane images;
    constructing volume prior probabilities based on the set of hypotheses;
    selecting seed pixels in the pair of current images using the volume prior probabilities;
    constructing a bi-plane dual image graph using intensity values and the seed pixels; and
    obtaining segmentation masks corresponding to tumor boundaries using image intensities to determine a current location of the tumor, wherein the steps performed in a processor.

2. The method of claim 1, wherein the segmentation masks are three dimensional and time-wise progressive.

3. The method of claim 1, wherein more than two image planes with known geometry are used.

4. The method of claim 1, wherein the images are acquired by two ultrasound transducer arrays.

5. The method of claim 1, wherein the images are acquired by slicing ultrasound volume of a three dimensional ultrasound transducer.

6. The method of claim 1, wherein the seed pixels are used to determine intensity distributions for the foreground and background pixels, assignments are determined using the selected seeds, and intensity prior information is obtained from the intensity distributions.

7. The method of claim 1, further comprising:
    refining the segmentation masks using the set of hypotheses.

8. The method of claim 1, wherein the segmentation masks are used to identify foreground pixels and background pixels.

9. The method of claim 1, further comprising:
    maintaining and updating reference images and reference masks if the segmentation masks identify foreground pixels.

10. The method of claim 1, wherein the bi-plane dual image graph includes vertices corresponding to pixels in the images, and edges connect the vertices, wherein each edge is associated with a weight indicating a similarity between the pixels corresponding to the vertices at each end of the edge.

11. The method of claim 1, wherein each pair of biplane images is jointly segmented.

12. The method of claim 6, further comprising:
    determining an appearance prior probability value at each vertex from foreground and background intensity distributions;
    determining a 3D volume prior information value at each vertex from segmentation hypotheses; and
    assigning weights to each vertex according to the appearance prior probability values and the 3D volume prior information values.

13. The method of claim 10, further comprising:
constructing a Laplacian matrix for the bi-plane dual image graph from the associated weights;
solving an extended system of linear equations for labels, according to $$(L+vI)r^s = vp^s,$$

wherein L is the Laplacian matrix, v is a blending parameter that controls an importance of a prior term, $r^s$ is the function that assigns probabilities to vertices for taking the label s, $p^s$ is a prior probability map for label s, and I is an identity matrix with the same dimensions as L; and
thresholding the labels to determine foreground and background vertices to obtain a segmentation mask of the bi-plane dual images.

14. The method of claim 10, further comprising:
constructing a Laplacian Matrix for the bi-plane dual image graph from the associated weights and labels of the seed vertices;
solving an extended system of linear equations for label s, according to $$(L_U+vI)r_U^s = =vp^s - B^T r_M^s,$$

wherein $L_U$, is matrix corresponding to the unknown labels, v is a blending parameter that controls an importance of a prior term, $r_U^s$ is a function that assigns probabilities to unlabeled vertices for taking label s, $p^s$ is a prior probability map for label s, $B^T$ is a transpose of a submatrix formed after a rearrangement of coefficients of the L matrix, $r_M^s$ is a function that assigns probabilities to labeled vertices for taking label s, and I is an identity matrix with the same dimensions as $L_U$; and
thresholding the labels to determine foreground and background vertices to obtain a segmentation mask of the bi-plane dual images.

15. The method of claim 9, further comprising:
determining a matching score as an overlap ratio between two segmentation masks; and
declaring the tumor is invisible in the current image if the matching score is less than a predetermined threshold.

16. The method of claim 10, further comprising:
growing a foreground region on the unlabeled vertices from foreground seed vertices and a background region from background seed vertices using the weights of the bi-plane dual image graph; and
assigning the vertices that are included first in the foreground region as being associated with the tumor.

17. The method of claim 10, further comprising:
adding vertices to the graph, wherein each added vertex, V corresponds to a label s, and each added vertex is connected to all pixel vertices with edges, wherein, the weights of the edges reflect a prior probability for each pixel to be assigned a label, of an added vertex.

18. The method of claim 17, further comprising:
determining a partitioning of the vertices into foreground and background vertex sets that minimizes the weight of the cut between the two partitions; wherein $$C = \Sigma_{i \in F, j \in B} w_{ij}$$

wherein F is a set of vertices in the foreground set, B is a set of vertices in the background set, $w_{ij}$ is the weight of the edge between vertices i and j, and C is a weight of the cut between the two sets.

19. The method of claim 18, further comprising:
assigning a maximum possible weight value to the edges between seed vertices and the added vertices so that such edges are guaranteed to be retained.

* * * * *